United States Patent
Raju et al.

(10) Patent No.: US 9,803,742 B1
(45) Date of Patent: Oct. 31, 2017

(54) STACKED PLANETARY GEAR ASSEMBLY WITH IMPROVED LUBRICATION

(71) Applicant: GM Global Technology Operations LLC, Detroit, MI (US)

(72) Inventors: Kothamasi Sumithra Raju, Bangalore (IN); Sudipto Ray, Bangalore (IN); Leonid Basin, Farmington Hills, MI (US); Hai Xu, Northville, MI (US); Avinash Singh, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/212,926

(22) Filed: Jul. 18, 2016

(51) Int. Cl.
| | | |
|---|---|---|
| *F16H 47/04* | (2006.01) | |
| *F16H 57/04* | (2010.01) | |
| *F16H 1/46* | (2006.01) | |
| *F16H 57/08* | (2006.01) | |

(52) U.S. Cl.
CPC .............. *F16H 57/043* (2013.01); *F16H 1/46* (2013.01); *F16H 57/0486* (2013.01); *F16H 57/082* (2013.01)

(58) Field of Classification Search
None
See application file for complete search history.

(56) References Cited

U.S. PATENT DOCUMENTS

| | | | |
|---|---|---|---|
| 8,512,192 B2 * | 8/2013 | Ziemer | F16H 57/0484 184/6.12 |
| 2017/0146113 A1 * | 5/2017 | Iwasaki | F16H 3/666 |

* cited by examiner

*Primary Examiner* — Dirk Wright

(57) ABSTRACT

A radially stacked planetary gear assembly provides improved lubrication fluid flow to the planet gear bearings of an outer planetary gear set which is especially important when the housing or outer planetary gear carrier is stationary. The assembly includes radially aligned or stacked inner and outer planetary gear sets each having a sun gear, a ring gear and a carrier having planet gears in constant mesh with the sun and ring gears wherein the ring gear of the inner gear set is also the sun gear of the outer gear set and the outer carrier is the assembly housing. The sun gear is disposed on a transmission shaft having lubrication passages which aligns with pluralities of radial openings in a hub housing. A circular plate or guide adjacent one side of the housing includes channels which align with the openings and functions as a lubrication director, channeling lubrication from the transmission shaft and the pluralities of radial openings in the housing hub to the outer bearings, shafts and planet gears.

18 Claims, 3 Drawing Sheets

STACKED PLANETARY GEAR ASSEMBLY WITH IMPROVED LUBRICATION

FIELD

The present disclosure relates to planetary gear assemblies for motor vehicle transmissions and more particularly to stacked planetary gear assemblies for motor vehicle transmissions having improved lubrication flow, especially to the pinion gears of the outer planetary gear set.

BACKGROUND

The statements in this section merely provide background information related to the present disclosure and may or may not constitute prior art.

In modern motor vehicle transmissions employing a plurality of planetary gear sets, radially stacked or nested planetary gear sets enable a more axially compact transmission configuration. While highly desirable from a packaging standpoint, this arrangement places the outer planetary gear set and especially the outer planet gear carrier a relatively significant distance from the source of lubrication which is generally the central transmission shaft. This distance, alone, can reduce the volume of transmission fluid (lubricant) flow to the outer planetary gear set. Moreover, in certain cases and during certain modes of operation, the outer carrier may be stationary and the flow of transmission fluid (lubricant) against gravity to the topmost pinion needle bearing and, to a lesser extent, the side pinion needle bearings, may be further reduced.

Such flow is, however, critical to bearing durability and longevity from not only a lubrication standpoint but also from a heat dissipation standpoint as planetary gear pinions in modern motor vehicle automatic transmissions may reach speeds of 12,000 r.p.m. and above during certain operational conditions.

Thus it is critical that suitable lubrication be provided to the pinion needle bearings of the outer planetary gear set of a stacked planetary gear assembly. The present invention is so directed.

SUMMARY

The present invention provides improved lubrication fluid flow to the planet anti-friction bearings of the outer planetary gear set of a radially stacked planetary gear assembly. This improvement is especially important when the housing or outer planetary gear carrier is stationary. The assembly includes radially aligned or stacked inner and outer planetary gear sets each having a sun gear, a ring gear and a carrier having planet gears in constant mesh with the sun and ring gears wherein the ring gear of the inner gear set is also the sun gear of the outer gear set and the outer carrier is the assembly housing. The sun gear is disposed on a transmission shaft having lubrication passages which aligns with pluralities of radial openings in a hub of the housing. A circular plate or guide adjacent one side of the housing includes channels which align with the openings and functions as a lubrication director, channeling lubrication from the transmission shaft and the pluralities of radial openings in the housing hub to the outer bearings, shafts and planet gears.

Thus it is an aspect of the present invention to provide improved lubrication to the outer planet gears of a stacked planetary gear assembly.

It is a further aspect of the present invention to provide improved lubrication to the outer planet gears of a stacked planetary gear assembly having a stationary outer carrier or housing.

It is a still further aspect of the present invention to provide a stacked planetary gear assembly having a housing and a lubrication directing plate disposed adjacent one side of the housing.

It is a still further aspect of the present invention to provide a stacked planetary gear assembly having improved lubrication and a transmission shaft including lubrication passages.

It is a still further aspect of the present to provide a stacked planetary gear assembly having improved lubrication and a housing having a hub with pluralities of radial lubrication openings.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
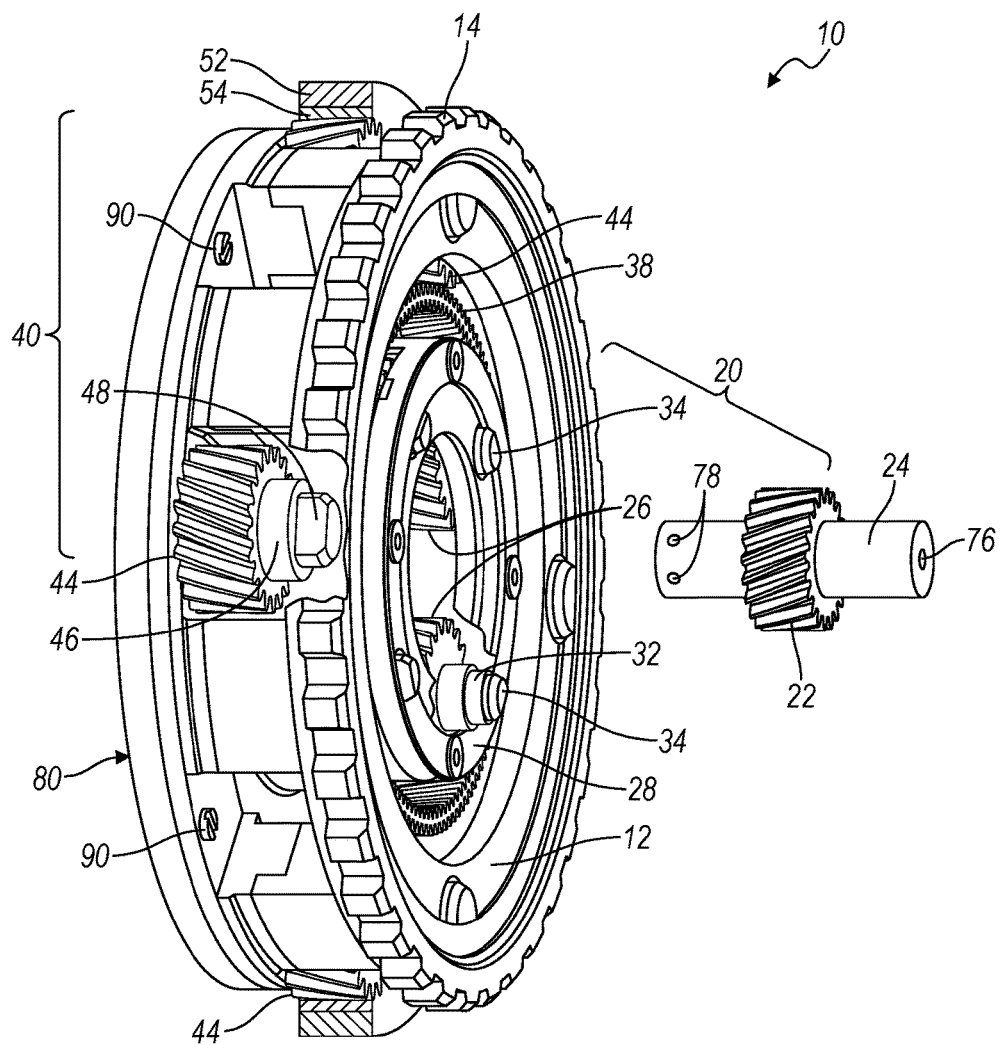
FIG. 1 is a front, partially exploded, perspective view of a stacked planetary gear set assembly incorporating the present invention.
Figure 2:
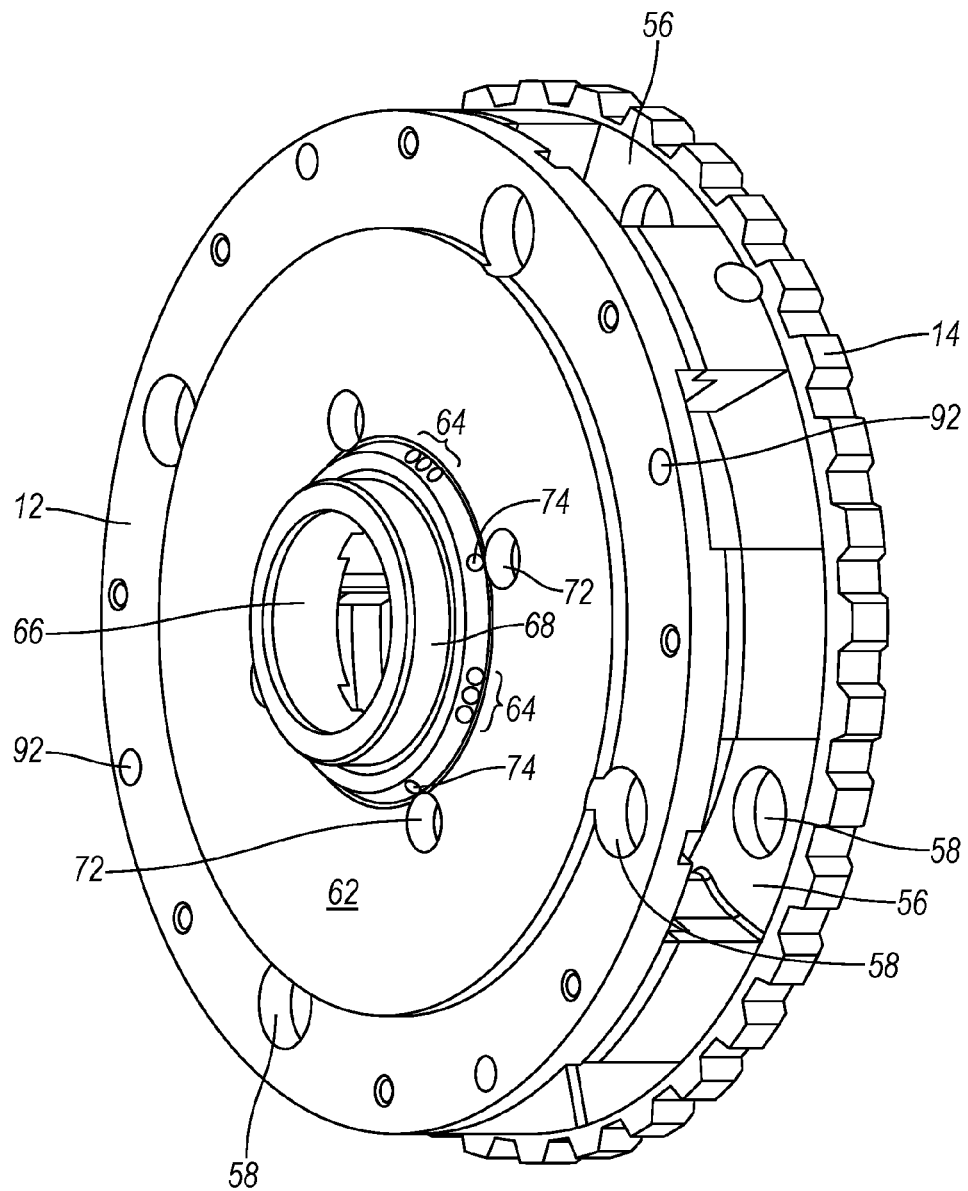
FIG. 2 is a rear perspective view of a housing of a stacked planetary gear set assembly according to the present invention.

With reference to FIGS. 1 and 2, a stacked planetary gear set assembly is illustrated and generally designated by the reference number 10. The stacked planetary gear assembly 10 includes a circular housing 12 having a continuous band of male splines or gear teeth 14 about a portion of the width of its periphery. As will be explained and understood more fully below, the housing 12 also functions as the carrier for the planet gears of the outer planetary gear set. The male splines or gear teeth 14 engage complementarily configured female spines or teeth (not illustrated) which may be internal to a stationary transmission housing (not illustrated) in which case the housing 12 is stationary or may be internal to a quill or other rotating component (also not illustrated) in which case the housing 12 is rotatable. The stacked planetary gear assembly 10 includes a first or inner planetary gear set 20 having a first sun gear 22 which is disposed on a drive or transmission shaft 24 and is radially aligned and in constant mesh with a first plurality of planet gears 26 rotatably disposed in a first planet carrier 28. The first plurality of planet gears 26 are each disposed on anti-friction bearings such as needle or roller bearings 32 disposed, in turn, on stub shafts 34 secured within the first planet carrier 28. A first ring gear 38 surrounds the first plurality of planet gears 26 and is in constant mesh with them.

The first ring gear 38 which has internal gear teeth also has external teeth and thus also functions as a second sun gear of a second or outer planetary gear set 40. The outer teeth on the ring gear 38 are in constant mesh with a second plurality of planet gears 44 which are rotatably disposed on anti-friction bearings such as roller or needle bearings 46 supported on stub shafts 48 which are mounted in the housing 12 which functions as a second planet gear carrier. A second ring gear 52 surrounds a portion of the housing 12 and includes gear teeth 54 which are in constant mesh with the second plurality of planet gears 44. The second ring gear 52 may also either be stationary, for example, connected to an outer, stationary housing (not illustrated) or rotatable, for example, connected to a quill or other rotating component (also not illustrated).

As illustrated in FIGS. 1 and 2, the housing 12 which, as noted, also functions as the planet carrier of the second planetary gear set 40 includes four notches or cut-outs 56 with pairs of axially aligned holes or circular openings 58 which receive the stub shafts 48. The four circular openings 58 on the rear face 62 of the housing 12 are radially aligned with four groups or pluralities of through lubrication openings or ports 64 that extend from the rear face 62 of the housing 12 to an inside surface 66 of a collar or hub 68 of the housing 12 which seats on the drive shaft 24. The housing 12 also includes holes or circular openings 72 which receive the stub shafts 34 supporting the first plurality of planet gears 26 and preferably also includes adjacent through lubrication openings or ports 74 that also extend from the rear face 62 of the housing 12 to the inside surface 66 of the collar or hub 68. The shaft 24 includes one or more axial lubrication passageway(s) 76 having one or more radial outlet ports 78 that axially align with the lubrication openings 64 and 74 and provide lubrication (oil or transmission fluid) flow from the axial lubrication passageway(s) 76 to the lubrication openings 64 and 74.

Figure 3:
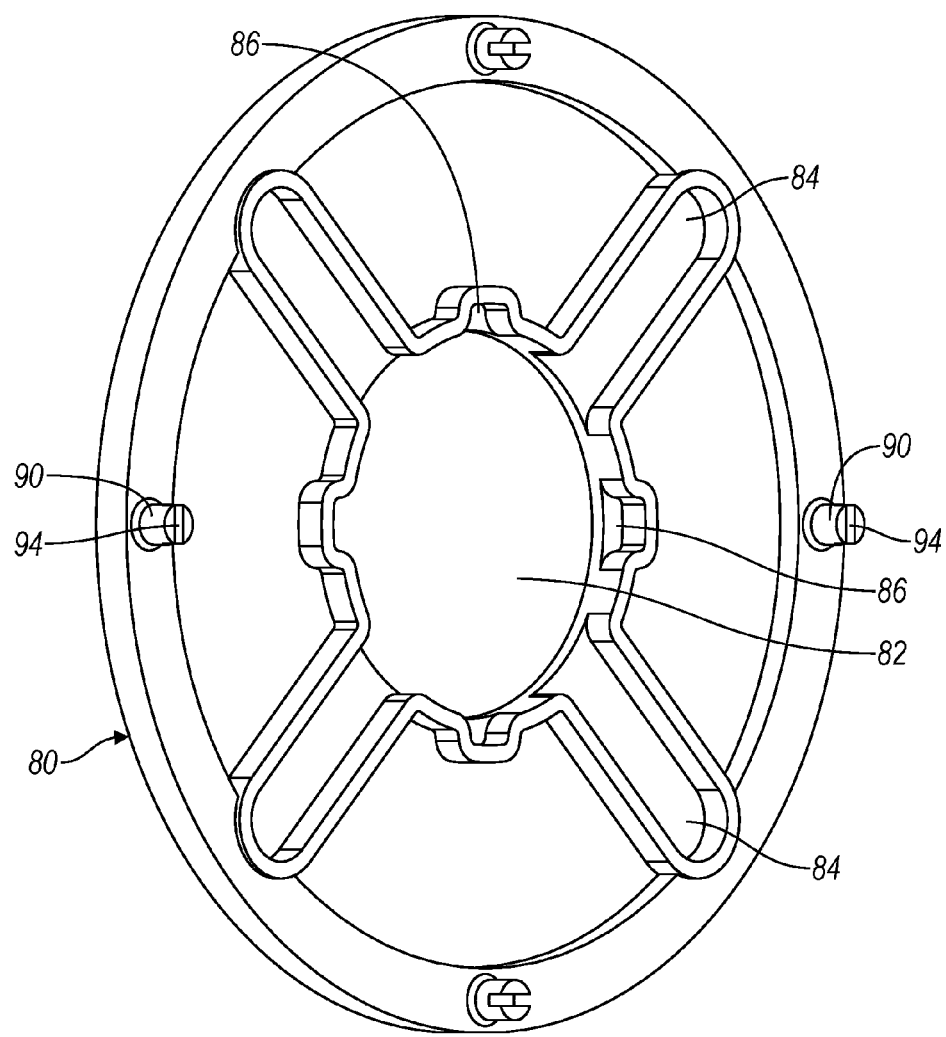
FIG. 3 is a perspective view of a lubrication plate or guide for a stacked planetary gear set assembly according to the present invention.

Referring now to FIGS. 1, 2 and 3, the lubrication openings 64 and 74 cooperate with a lubrication directing disc, plate or guide 80 having a center opening 82 which sealingly receives and seats on the collar or hub 68 of the housing 12. The lubrication directing plate 80 includes a plurality of radial channels or grooves 84 which align with and cover the four groups or pluralities of through lubrication openings 64 in the housing 12. The edges of the channels or grooves 84 seal against the rear face 62 of the housing 12 and direct lubricating fluid radially outwardly. It should be appreciated that while FIG. 2 shows three lubrication openings 64 in each of four groups, more or fewer openings 64, depending upon their size and the desired fluid flow, may be utilized and are within the purview of this invention. As to the number of groups, the number will be equal to both the number of planet gears in the second plurality of planet gears 44 and the number of radial channels 84 in the lubrication directing plate 80. Thus, while FIGS. 2 and 3 illustrate four planet gears 44 and four radial channels 84, for example, a second or outer planetary gear set having three planet gears will be mated with a housing 12 having three groups of lubrication openings 64 and a lubrication directing plate 80 having three radial channels 84.

The lubrication directing plate or guide 80 also includes a second plurality of short or stub channels 86 intermediate the first plurality of channels 84 which extend to and cover the circular openings 72 and the lubrication openings or ports 74 and direct lubrication flow from the lubrication openings or ports 74 to the first plurality of planet gears 26, the first needle or roller bearings 32 and the first stub shafts 34.

The lubrication directing plate or guide 80 also includes a plurality of male bosses, lugs or register pins 90 that mate with complementarily configured and arranged apertures or openings 92 in the housing 12 which cooperatively ensure that the radial channels 84 of the lubrication directing plate or guide 80 radially align with the four groups or pluralities of through lubrication openings 64 and the four circular openings 58 which support the stub shafts 48, the needle or roller bearings 46 and the second plurality of planet gears 44 and that the short or stub channels 86 of the lubrication directing plate or guide 80 radially align with the lubrication openings or ports 74, the circular openings 72 which support the stub shafts 34, the needle bearings 32 and the first plurality of planet gears 26. If desired the bosses, lugs or register pins 90 may be split or divided at a line of diameter 94 and may be slightly oversize to provide a positive friction fit of the pins 90 within the openings 92.

It will be appreciated that a stacked planetary gear assembly 10 incorporating the present invention provides greatly improved lubrication flow to the outer planet gears, bearings and shafts. This is particularly important when the outer planet carrier or housing is stationary.

The description of the invention is merely exemplary in nature and variations that do not depart from the gist of the invention are intended to be within the scope of the invention. Such variations are not to be regarded as a departure from the spirit and scope of the invention.

What is claimed is:

1. A stacked planetary gear assembly comprising, in combination,
a first planetary gear set including a first sun gear on a shaft, said shaft having an axial lubrication passage communicating with at least one outlet port, a first ring gear and a first planet carrier having a first plurality of planet gears in constant mesh with said first sun gear and said first ring gear,
a second planetary gear set including a second sun gear coupled to said first ring gear, a second ring gear and a second planet carrier having a second plurality of planet gears in constant mesh with said second sun gear and said second ring gear,
said second planet carrier having a hub adapted to receive said shaft and a plurality of fluid passages extending through said hub and communicating with said outlet port, and
a lubrication plate having a plurality of channels extending from said fluid passages in said hub to said second plurality of planet gears.

2. The stacked planetary gear assembly of claim 1 wherein said plurality of channels also extend to said first plurality of planet gears.

3. The stacked planetary gear assembly of claim 1 wherein said first and second pluralities of planet gears include anti-friction bearings disposed on stub shafts.

4. The stacked planetary gear assembly of claim 1 wherein said first ring gear has internal gear teeth and external gear teeth and also functions as a sun gear of said second planetary gear set.

5. The stacked planetary gear assembly of claim 1 wherein said second planetary gear carrier includes teeth disposed about a portion of a width of its periphery.

6. The stacked planetary gear assembly of claim 1 wherein said lubrication plate includes a plurality of register pins and said second planet gear carrier includes openings adapted to receive said pins and rotationally locate said plate on said second planet gear carrier.

7. The stacked planetary gear assembly of claim 1 wherein said lubrication plate includes a center opening adapted to receive said hub of said second planet gear carrier.

8. A stacked planetary gear assembly having improved lubricant flow, comprising, in combination,
- a shaft having an axial lubrication passage communicating with an outlet port,
- an inner planetary gear set including an inner sun gear on said shaft, an inner ring gear and an inner planet carrier having a plurality of inner planet gears meshing with said inner sun gear and said inner ring gear,
- an outer planetary gear set including outer sun gear teeth on said inner ring gear, an outer ring gear and an outer planet carrier having an outer plurality of planet gears meshing with said sun gear teeth and said outer ring gear,
- said outer planet carrier having a hub adapted to receive said shaft and a plurality of fluid passages extending through said hub and communicating with said outlet port of said shaft, and
- a lubrication guide having a plurality of channels extending from said plurality of fluid passages in said hub to said second plurality of planet gears.

9. The stacked planetary gear assembly of claim 8 wherein said plurality of channels also extend to said first plurality of planet gears.

10. The stacked planetary gear assembly of claim 8 wherein said first and second pluralities of planet gears include anti-friction bearings disposed on stub shafts.

11. The stacked planetary gear assembly of claim 8 wherein said first ring gear has internal gear teeth and external gear teeth and also functions as a sun gear of said second planetary gear set.

12. The stacked planetary gear assembly of claim 8 wherein said second planetary gear carrier includes teeth disposed about a portion of a width of its periphery.

13. The stacked planetary gear assembly of claim 8 wherein said lubrication plate includes a plurality of register pins and said second planet gear carrier includes openings adapted to receive said pins and rotationally locate said plate on said second planet gear carrier.

14. The stacked planetary gear assembly of claim 8 wherein said lubrication plate includes a center opening adapted to fit over said hub of said second planet gear carrier.

15. A stacked planetary gear assembly having improved lubricant flow comprising, in combination,
- a shaft having an axial lubrication passage communicating with at least one outlet port,
- a first planetary gear set including a first sun gear disposed on said shaft, a first ring gear and a first planet carrier having a first plurality of planet gears meshing with said first sun gear and said first ring gear,
- a second planetary gear set including second sun gear teeth on said first ring gear, a second ring gear and a second planet carrier having a second plurality of planet gears disposed on anti-friction bearings and meshing with said second sun gear and said second ring gear,
- said second planet carrier having a hub adapted to receive said shaft and a plurality of fluid passages extending through said hub and communicating with said at least one outlet port, and
- a lubrication disc having a plurality of channels extending from said fluid passages in said hub to said anti-friction bearings.

16. The stacked planetary gear assembly of claim 15 wherein said plurality of channels in said lubrication disc also extend to said first plurality of planet gears.

17. The stacked planetary gear assembly of claim 15 wherein said lubrication disc includes a plurality of register pins and said second planet gear carrier includes openings adapted to receive said pins and rotationally locate said disc on said second planet gear carrier.

18. The stacked planetary gear assembly of claim 15 wherein said lubrication disc includes a center opening adapted to receive said hub of said second planet gear carrier.

* * * * *